United States Patent [19]

Brosene, Jr.

[11] 4,222,426
[45] Sep. 16, 1980

[54] BEAD BREAKER MECHANISM FOR A TIRE CHANGER MACHINE

[75] Inventor: William G. Brosene, Jr., Cincinnati, Ohio

[73] Assignee: Magnum Automotive Equipment, Inc., Cincinnati, Ohio

[21] Appl. No.: 14,042

[22] Filed: Feb. 22, 1979

[51] Int. Cl.³ .............................................. B60C 25/06
[52] U.S. Cl. ................................................. 157/1.28
[58] Field of Search ........................... 157/1.17, 1.28

[56] References Cited

U.S. PATENT DOCUMENTS

| | | | |
|---|---|---|---|
| 3,807,477 | 4/1974 | Curtis | 157/1.28 |
| 3,827,474 | 8/1974 | Besuden | 157/1.28 |
| 3,827,475 | 8/1974 | Brosene | 157/1.28 |
| 3,877,505 | 4/1975 | Besuden et al. | 157/1.28 |
| 4,122,883 | 10/1978 | Askam | 157/1.17 |

*Primary Examiner*—James G. Smith
*Attorney, Agent, or Firm*—Wood, Herron & Evans

[57] ABSTRACT

An improved bead breaker mechanism in which the bead breaker is comprised of two blades held in immobile spaced relation relative one to the other, the two blades defining two spaced working faces in a common plane adapted to lie flush against the bead area of a tire when the two blades are butted against a rim's flange in initial set up position prior to breaking the tire's bead away from the rim. The blades are preferably formed from curved plates having a common curvature axis, that axis being angled relative to the median plane of the rim in a direction away from the rim's center when the two blades are butted against the rim's flange in the set up position. The curvature of the blades preferably is such that no point on the rim edge of each blade is spaced away from the rim's flange a distance greater than about two times the tire's bead core diameter when the blades are butted against the rim's flange in set up relation. The bead breaker blades are swingably connected to a power unit for moving the blades between storage and use positions. The bead breaker mechanism and power unit are structured so that, in use, the bead breaker blades are drawn from the set up position toward the rim's center plane in a generally linear and radially inward directed fashion without the blades being latched to the tire's rim and without contact of the blades with the rim. At maximum extension of the bead breaker blades by the power unit, the working faces of the blades are entirely located radially inward of the rim's flange.

17 Claims, 15 Drawing Figures

BEAD BREAKER MECHANISM FOR A TIRE CHANGER MACHINE

This invention relates to automatic tire changer machines. More particularly, this invention relates to an improved bead breaker mechanism for an automatic tire changer machine.

The mounting of a pneumatic tire on a rim, and the demounting of a pneumatic tire from a rim, used to be done totally by hand. Such provided major problems for an operator in that a pneumatic tire's beads are relatively inflexible. In mounting a tire on a rim, both the tire's beads must be disposed over one side of the rim into the rim's well area so as to initially locate the tire on the rim. The tire is then inflated in place on the rim. In demounting the tire from the rim, the procedure is reversed with the tire first being deflated. The tire's beads are then broken away from the rim's bead seats and located in the rim's well area. The tire's beads are thereafter removed from the rim's well area over one side of the rim so that the tire is free of the rim. Over the years, a number of different types of automatic tire changing machines have been developed which provide mechanical means to assist in mounting a tire onto, and demounting a tire from, a rim. Thus, the main objective of an automatic tire changer machine is to aid an operator in demounting or removing an undesirable pneumatic tire from a rim, and to aid an operator in mounting or installing a different pneumatic tire onto that rim.

The more advanced automatic tire changer machines make use of an upper bead breaker mechanism and a lower bead breaker mechanism (the use of upper and lower throughout the description is with reference to a tire laid horizontally on the machine's table). These bead breaker mechanisms are used only when demounting a tire from a rim, i.e., are not used when mounting a tire onto a rim. As is generally known, pneumatic tires are installed on a rim with a substantial degree of air pressure, and that air pressure must be relieved prior to removing or demounting the tire from the rim. Further, and particularly in the case of tubeless pneumatic tires, the tire's upper and lower beads (as the tire lies horizontally on the machine's table) are stuck to some extent, i.e., are sealed, against the rim's upper and lower bead seats, respectively. Thus, the tire's beads must be broken away from the rim's bead seats prior to removing the tire from the rim during the demounting operation. The objective of the upper and lower bead breaker mechanisms is to accomplish this function.

The upper and lower bead breakers are usually mechanically operated by a power unit to perform the breaking function, i.e., to break the tire's upper and lower beads from the rim's upper and lower bead seats. In the more advanced automatic tire changer machines, the upper and lower bead breakers are in the nature of jaws which are initially positioned adjacent the tire's upper and lower beads, respectively, and which are then caused to move toward one another relatively simultaneously so as to compress the beads toward one another (i.e., toward the center plane of the wheel and away from the bead seats of the rim), thereby breaking the tire's beads away from the rim's bead seats and totally depressurizing the tire.

There is one major problem associated with most known bead breaker mechanisms of the prior art. This problem arises during operation of the bead breaker mechanism. Basically, an upper bead breaker mechanism includes an upper bead breaker blade adapted to bear against the tire's side wall, and to push against that side wall in a direction toward the center plane of the rim, for dislodging the tire's upper bead from the rim's upper bead seat and orienting it in the rim's well. There are two basic types of mechanisms by which the upper bead breaker blade is mechanically operated. One basic type of mechanism simply applies a force on the blade generally normal to the median plane of the rim. The second is a more complicated mechanism, and is designed to cause the upper bead breaker's blade to follow the outer contour of the rim's outer surface as the blade is drawn toward the median plane of the rim. In practice, however, and in connection with the former type mechanism, the blade itself is positioned on the tire's side wall a substantial distance removed from the tire's upper bead, thereby tending to cause the side wall to pivot about the tire's bead, i.e., thereby not dislodging the tire's bead from the rim's bead seat, as the blade is drawn downwardly toward the rim's center plane. In the latter structure, and instead of moving inwardly to track against the outer surface of the rim, the upper bead breaker's blade may well tend to move radially outward or away from the rim as it is moved downwardly for the reason that the resistive forces encountered by that blade (as provided by the pneumatic tire) in its operational or motion path tend to force the blade radially outward (as opposed to a desired radially inward path where it would track on the rim's outer surface) as the blade is moved downwardly by the machine's power source. This tendency of the upper bead breaker's blade to roll back or to creep back along the tire's side wall away from the tire's bead reduces the effectiveness of the upper bead breaker in breaking the tire's bead away from the rim. Further, and in the case of both of these structures, the use of the bead breaker blade directly on the tire's side wall may lead to undesirable scuffing or wearing of the tire's upper side wall as the upper bead breaker blade's blade slides or slips radially outward on the tire's side wall. One approach toward overcoming this problem in the tracking type upper bead breaker mechanism is to provide some kind of a latch device by which the upper bead breaker blade mechanism can be connected with the outer flange of the rim. While this is useful in some situations, it does not entirely solve the problem in that it may tend to mar or otherwise disfigure certain types of rims where no surface marring is desired.

Therefore, it has been one objective of this invention to provide a novel bead breaker mechanism for a tire changer machine that provides a bead breaker which moves in a generally linear radially inward direction during use from a set up position in contact with a rim's flange where the blade rests on a tire's bead area toward the rim's center plane to a maximum extension position where the tire contact area or working face of the blade is entirely located radially inward of the rim's flange which generally linear radially inward path is reproduceable time after time upon repeated operation of the bead breaker mechanism with different diameter rims without directly connecting the bead breaker blade to the rim's flange, the bead breaker blade being swingable between a use position where it can be set upon a tire disposed on the machine's table and a storage position where the table is accessible for receiving a different tire thereon.

Another objective of this invention has been to provide a novel bead breaker mechanism for an automatic tire changer machine which is comprised of two spaced blades, the blades each defining a working face which are oriented in a common plane adapted to contact the bead area of a tire upon being abutted against a rim's flange when set up prior to use, the front or rim edges of the two faces lying on a common curvalinear line, which is sized and configured such that neither blade's rim edge is spaced from the rim's flange a distance greater than about two times the diameter of the tire's bead core at any point therealong, and the working faces each having a width not greater than about two times the diameter of the tire's bead core, the two spaced blades being structured to cooperate with a power unit adapted to draw the blades radially inward toward the rim's center plane from the set up position without contact of the blades with the rim.

In accord with these objectives, and in a preferred form, this invention is directed to an improved bead breaker mechanism in which the bead breaker is comprised of two blades held in immobile spaced relation relative one to the other, the two blades defining two spaced working faces in a common plane adapted to lie flush against the bead area of a tire when the two blades are butted against a rim's flange in initial set up position prior to breaking the tire's bead away from the rim. The blades are preferably formed from curved plates having a common curvature axis, that axis being angled relative to the median plane of the rim in a direction away from the rim's center when the two blades are butted against the rim's flange in the set up position. The curvature of the blades preferably is such that no point on the rim edge of each blade is spaced away from the rim's flange a distance greater than about two times the tire's bead core diameter when the blades are butted against the rim's flange in a set up relation. The bead breaker blades are swingably connected to a power unit for moving the blades between storage and use positions. The bead breaker mechanism and power unit are structured so that, in use, the bead breaker blades are drawn from the set up position toward the rim's center plane in a generally linear and radially inward fashion without the blades being latched to the tire's rim without contact of the blades with the rim. At maximum extension of the bead breaker blades by the power unit, the working faces of the blades are entirely located radially inward of the rim's flange.

Other objectives and advantages of this invention will be more apparent from the following detailed description taken in conjunction with the drawings in which:

GENERAL STRUCTURE AND USE OF TIRE CHANGER MACHINE

Figure 1:
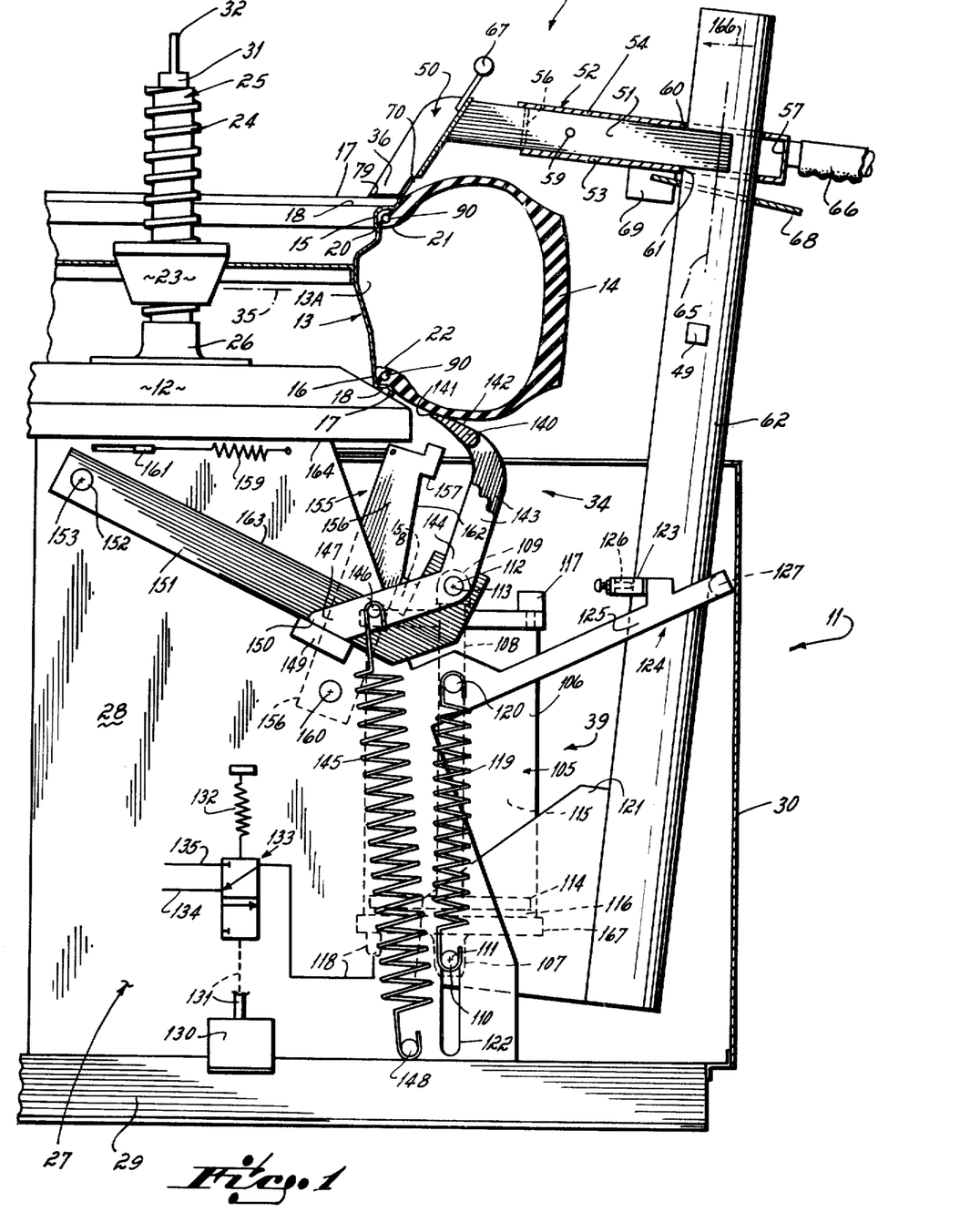
FIG. 1 is a side view illustrating an automatic tire changer machine with a bead breaker mechanism incorporating the principles of this invention, the upper bead breaker and lower bead breaker blades being shown in the set up position prior to use.
Figures 2, 2A, 3:
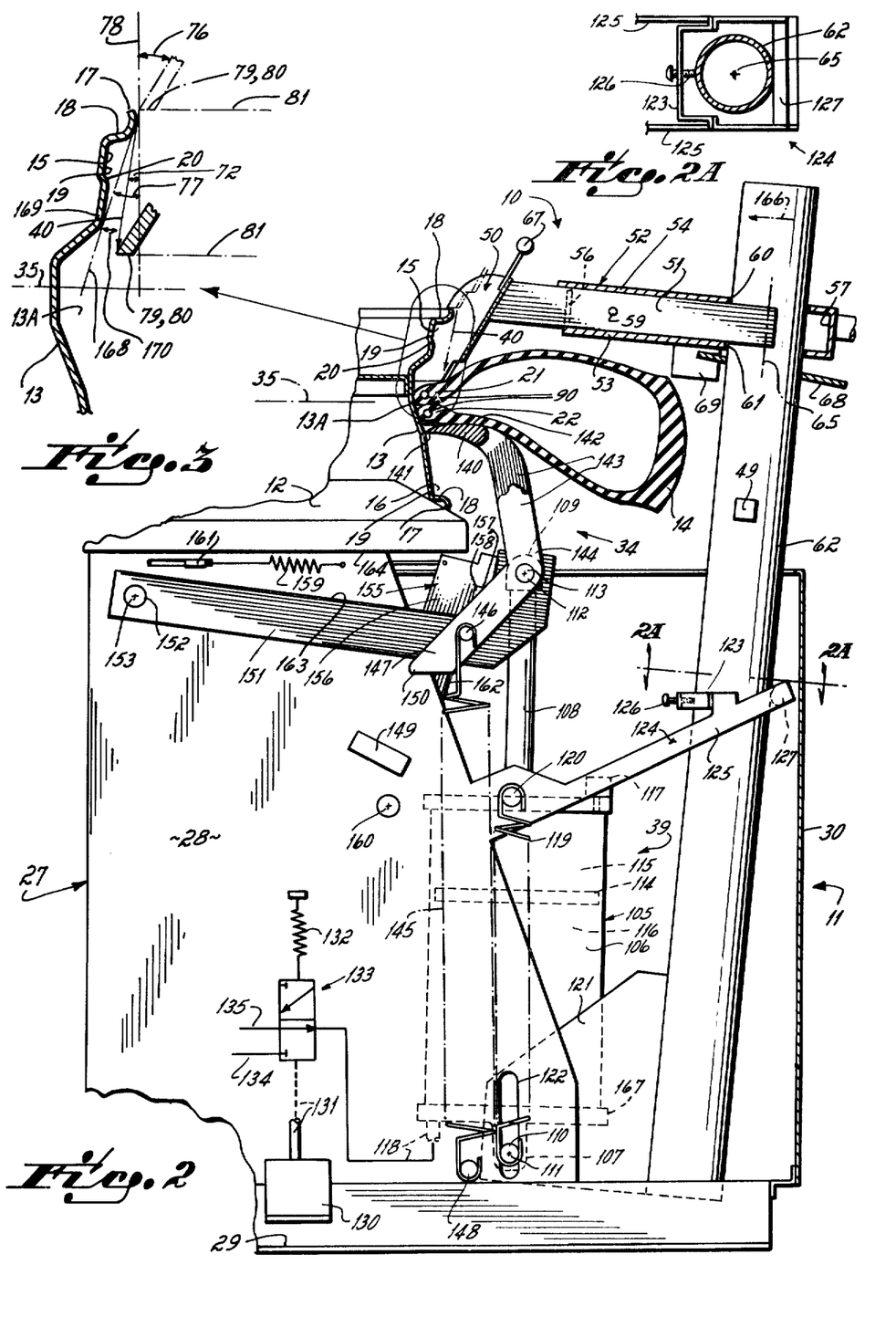
FIG. 2 is a side view similar to FIG. 1, but showing the bead breaker blades in maximum extension position after breaking a tire's beads away from the rim's bead seats.
FIG. 2A is a cross sectional view taken on lines 2A—2A of FIG. 2.
FIG. 3 is an enlarged view of the encircled portion of FIG. 2.

The improved bead breaker mechanism 10 of this invention is illustrated in its structural environment in FIGS. 1 and 2. As shown in these figures, the improved bead breaker mechanism 10 is structurally integrated with a tire changer machine 11.

The tire changer machine 11 includes a horizontally disposed table 12 adapted to receive a rim 13 having a fully inflated pneumatic tire 14 mounted thereon, see FIG. 1. The rim 13 includes a bead seat 15, 16 portion on each side of a well portion, each bead seat portion having an outer peripheral flange 17, a lateral bead seat 18 area and a radial bead seat 19 area. The rim's outer radial bead seat 19 area defines a safety rib 20 for capturing the tire's outer bead on that seat. Of course, the tire's upper bead 21 and lower beads 22 are seated on the rim's bead seats 15, 16, respectively. The rim 13 is held in fixed position on the table 12 by a hold-down cone 23, the hold-down cone being threadedly engaged with exteriorly threaded (as at 24) sleeve 25. The sleeve 25 is immobily mounted to the table by collar 26. The table 12 itself is supported on and fixed to the machine's main frame 27, see FIG. 1. The main frame 27 includes parallel and spaced apart side walls 28 that terminate in and are fixed to flanged feet 29. The feet 29 extend the length of the machine and are adapted to be bolted to a concrete floor in, e.g., a gasoline station, to provide stability for the machine during its operational cycle. A shroud 30 is fixed to the main frame 27 for enclosing the operational structure of the machine 11.

A centerpost 31 extends vertically upward from beneath the table 12 and terminates in flatted end 32 above the rim 13 and tire 14. The rotatable centerpost 31 is coaxially and interiorly located relative to the fixed threaded sleeve 25. The outside diameter of the centerpost 31 is sized relative to the inside diameter of the threaded sleeve 25 so that the centerpost can easily rotate relative thereto in either the clockwise or counter-clockwise direction. The centerpost 31 is mounted to the machine's main frame 27 at its lower end portion where it is supported for rotation at spaced locations adjacent its lower end portion by means of spaced bearing blocks (not shown), and is supported for rotation adjacent its upper end portion by virture of passing through threaded sleeve 25. Rotation of the centerpost 31 and, hence, rotation of a tire tool (not shown) is operator controlled through foot pedals (not shown). A mechanism for rotating the centerpost 31, and the controls therefor, is particularly disclosed in U.S. Pat. No. 3,847,198, issued Nov. 12, 1974, and entitled "Centerpost Drive Mechanism".

The automatic tire changer machine 11 also includes upper 10 (as mentioned) and lower 34 bead breakers. The upper 10 and lower 34 bead breakers are adapted to move toward the center or median plane 35 of the rim 13 as the rim 13 and tire 14 on the machine's table 12. Operation of the upper bead breaker 10 is accomplished by moving blades 36, 37 (see FIGS. 4 and 9) downwardly against the tire's upper bead 21 area by a bead breaker power unit 39; the generally linear path 40 that the arcuate leading edges 41, 42 of the blades 36, 37 follow as same move downward and radially inward is illustrated in detail in FIG. 3. That path 40 and the structure of the upper bead breaker 10 are described in detail below. Operation of the lower bead breaker 34 is accomplished by moving blade 140 upwardly against the tire by use of the same power unit 39. The operation and structure of the lower bead breaker 34 are more particularly described in U.S. Pat. No. 3,807,477, issued Apr. 30, 1974 and entitled "Bead Breaker Mechanism". The power unit 39, in effect, both interconnects and powers the two bead breakers 10, 34. This downward motion of the upper bead breaker 10 and upward motion of the lower bead breaker 34 is carried out substantially simultaneously and, in essence, serves to break or separate the tire's upper 21 and lower 22 beads away from the upper 15 and lower 16 bead seats of the rim 13 on which the tire 14 is mounted. This prepares the tire 14 for subsequent removal from the rim 13.

As noted, when an operator desires to demount a tire 14 from a rim 13, the operator must make use of the upper 10 and lower 34 bead breakers prior to removing the tire from the wheel. That is, the tire's beads 21, 22 must be broken away from the rim's bead seats 15, 16 from the FIG. 1 position into the FIG. 2 position prior to completely removing or demounting the tire 14 from the rim 13. After the beads 21, 22 have been broken away from the rim's bead seats 15, 16, the slotted body section of a tire tool (not shown) is engaged with the centerpost's flatted portion 32 so that rotation of the centerpost 25 is translated into rotation of the tire tool. After the tire tool (not shown) has been engaged with the centerpost 25 and after the tire tool's demount head (not shown) has been operatively positioned between a tire's bead 21 or 22 and the rim's upper flange 17, rotation of the centerpost (and, therefore, rotation of the tire tool's demount head, not shown), causes the tire's bead to be lifted over the rim's flange so that it is totally removed from the wheel. A mount/demount tire tool particularly adapted for use with the automatic tire changer shown herein is illustrated in U.S. Pat. No. 3,823,756, issued July 16, 1974 and entitled "Mounting Head for a Tire Tool".

Upper Bead Breaker Mechanism

Figure 4:
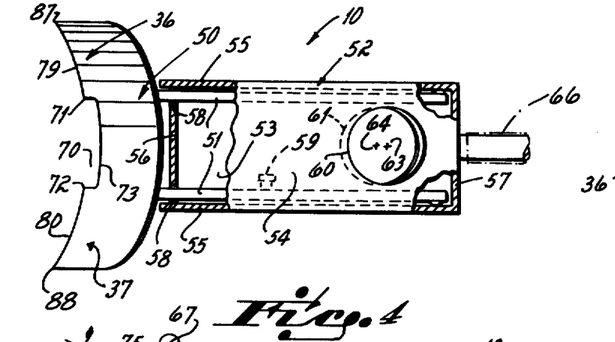
FIG. 4 is a top view of an upper bead breaker blade mechanism in accord with the principles of this invention.

The upper bead breaker 10 mechanism is particularly shown in FIGS. 1, and 4-11. As shown in FIG. 4, the upper bead breaker 10 is comprised of spaced two blades 36, 37 formed in a single integrated blade plate 50. The blade plate 50 is fixed on its back face to slide arms 51 which are slidably received in a housing 52. The housing 52 is comprised of bottom wall 53, top wall 54, side walls 55 and end walls 56, 57, the front end wall 56 being provided with guideways 58 to permit the blade plate's slide arms 51 to slide in and out of the housing. The inner location of the blade plate 50 relative to the housing 52 is established by contact of the slide arms 51 with the rear end wall 57 of the housing, and the outer position of the blade plate 50 relative to the housing is established by interengagement of slide arm stop 59 with the inside face of the housing's end wall 56. The top 54 and bottom 53 walls of the housing 52 are each provided with circular ports 60, 61, as shown in FIGS. 1 and 4. These circular ports 60, 61 are of the same size, and are sized to permit the machine's power column 62 (which is part of power unit 39) to be received in a sliding fit relation therewith when the axes 63, 64 of those ports are aligned with the axis 65 of the power column. The housing also includes a grip type handle 66 extending outwardly from and fixed to rear end walls 57, and a nob type handle 67 extending upwardly and fixed to the blade plate 50 for allowing an operator to swivel the housing 52 (and, hence, the upper bead breaker blades 36, 37) between the set up position shown in FIGS. 1 and 2, and a storage position at, for example, 90° from that set up position, as well as for allowing an operator to position the housing 52 (and, hence, the upper bead breaker blades) along the column's axis 65 as desired preparatory to use or storage of the bead breaker mechanism. The housing 52 also mounts a latch plate 68 through use of latch mount element 69, the latch 68 structured and cooperating with the power column 62 as described in U.S. Pat. No. 3,827,474, issued Aug. 6, 1974 and entitled "Power Column Latch".

Figure 5:
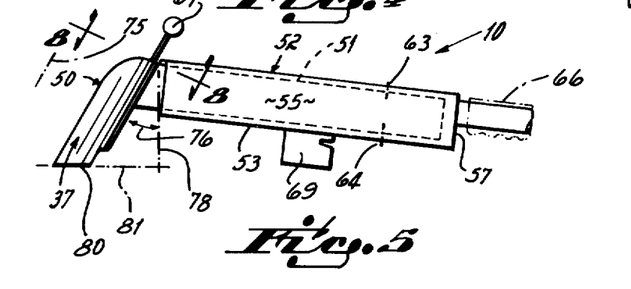
FIG. 5 is a side view of the upper bead breaker mechanism shown in FIG. 4.
Figure 6:
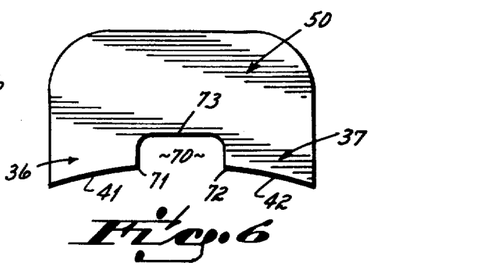
FIG. 6 is a top view of an initial blade workpiece used in fabricating the preferred form of the upper bead breaker.
Figure 7:
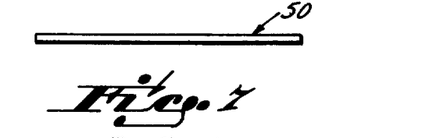
FIG. 7 is an end view of the blade workpiece shown in FIG. 6.
Figure 8:
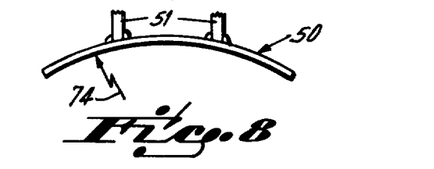
FIG. 8 is a cross sectional view taken along lines 8—8 of FIG. 5.

The two blade 36, 37 upper bead breaker plate 50 is fabricated from a workpiece as shown in FIGS. 6 and 7. The bead breaker plate 50, which is initially flat as shown in FIG. 6, is configured with a cutout or throat 70 established between inner ends 71, 72 of the blades 36, 37 so as to define the two blades from a single workpiece. The rim edges 41, 42 of the flat plate 50 are slightly curved and extend downwardly and outwardly relative to the closed end 73 of the throat, as shown in FIG. 6. An end view of the plate shown in FIG. 6 is illustrated in FIG. 7. Subsequently the flat plate 50 shown in FIG. 5 is curved to the radius shown in FIG. 8. This radius 74, however, is not the radius of the bead breaker blades' rim edges 41, 42 when same are oriented in set up position as shown in FIGS. 1, 5 and 8 because the bead breaker plate 50 is angled, i.e., because the curvature axis 75 of that plate is angled, relative to the median plane 35 of a tire 14 and rim 13 on the tire changer machine 11 when the blades 36, 37 are in set up position relative to that tire as shown in FIG. 1. This angle 76 of inclination of the bead breaker blades' plate curvature axis 75 is shown in FIG. 5. The plate 50, and hence the blades 36, 37, is angled upwardly and outwardly, relative to rim 13 as shown in FIG. 1, at an angle 76 greater than the travel path angle 77 of the blades 36, 37, the angles 76, 77 being measured relative to a line 78 normal to median plane 35 of the tire. This is the case for two reasons; first, to permit the machine's operator to properly position the blades 36, 37 in abutting contact with the rim's peripheral flange 17 upon set up prior to use, and second, to insure that the blades 36, 37 and blade plate 50 do not interfere with or contact that peripheral flange 17 as the blade plate 50 is drawn inwardly and downwardly in its controlled bead breaking path 40 as shown in FIGS. 2 and 3. Note also that the bottom or working faces 79, 80 of the two bead breaker blades 36, 37 are in a common plane 81 as shown in FIG. 5, that common plane being generally parallel to the tire's median plane 35 during set up as shown in FIG. 1 and at all stages during the bead breaking operation as shown in FIG. 2.

Figure 9:
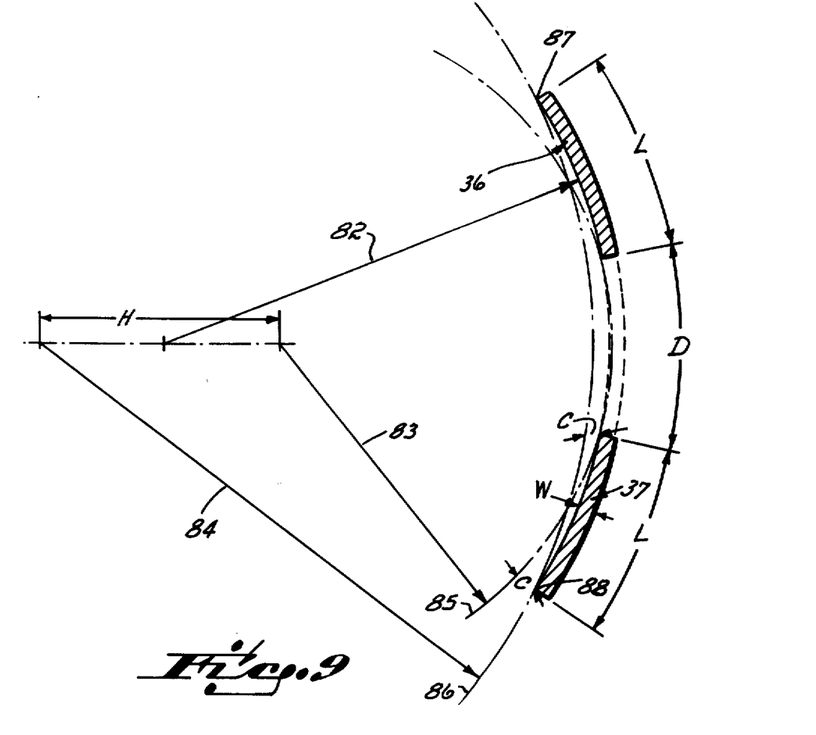
FIG. 9 is a top diagrammatic view illustrating the geometry of the upper bead breaker blades when in set up position with rims of maximum and minimum rim diameter.
Figure 10:
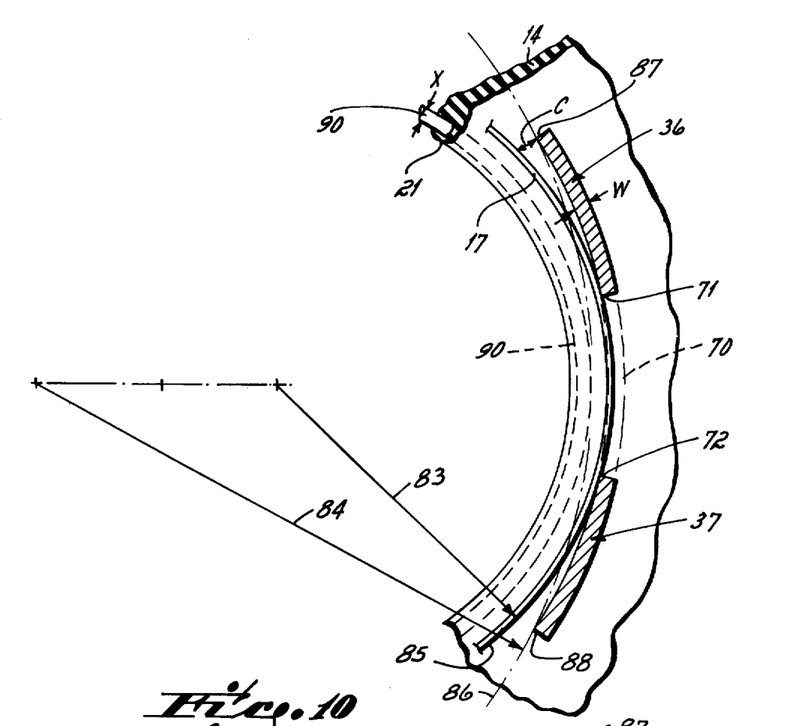
FIG. 10 is a view similar to FIG. 8 but showing the blades in set up position with a rim of minimum rim diameter.
Figure 11:
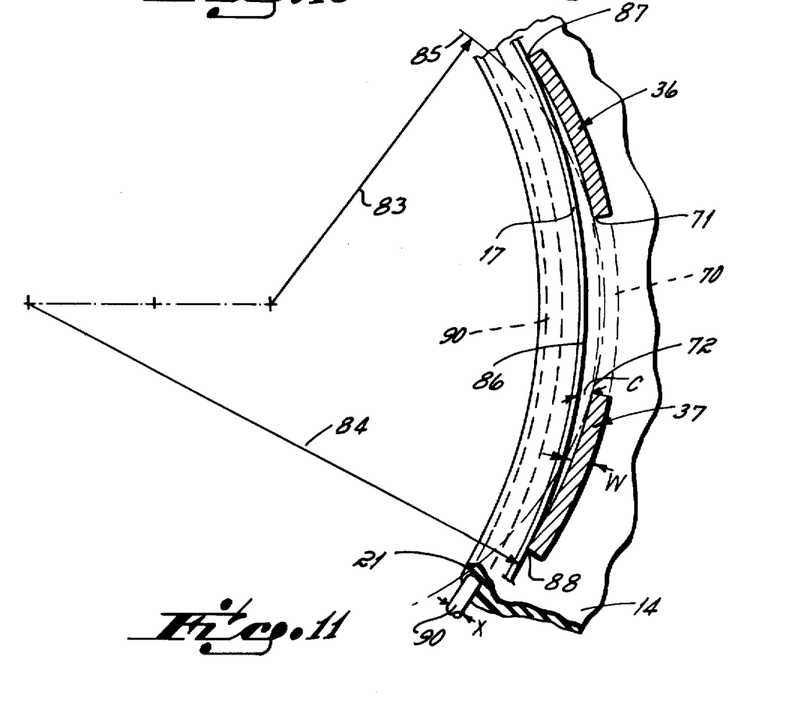
FIG. 11 is a view similar to FIG. 8 but showing the blades in set up position with a rim of maximum rim diameter.

The geometry and size relationship of the bead breaker blades 36, 37 is important to this invention relative to the prior art, and this relationship is shown more particularly in FIGS. 9-11. The two bead breaker blades 36, 37 are spaced apart one from another a distance D approximately equal to the length L of one of the blades. Further, and importantly, the working edge faces 79, 80 of the bead breaker blades define a single curvilinear rim edge 41, 42 which is on an optimum radius 82 relative to the outside rim radius 83, 84 of those rims which the upper bead breaker blades 36, 37 are adapted to serve. For example, and as shown in FIGS. 9-11, the rim edges 41, 42 of the bead breaker blades are on a radius adapted to serve rims of about 14" rim diameter. This allows the bead breaker blades 36, 37 to cooperate with 10" rim diameter rims 85 (where the rim's flange 17 contacts the inner ends 71, 72 of the bead breaker blades as shown in FIG. 10), and also allows the bead breaker blades to be useful with 17½" rim diameter rims 86 (where the rim's flange 17 contacts the outer ends 87, 88 of the bead breaker blades as shown in FIG. 11). Note in this connection that, because of the cutout or spaced relationship at throat 70 between the two blades 36, 37, the 10" rim diameter rim 85 can be accomodated by the blades in accord with the geometrical and dimensional relationships further explained below, whereas it could not be so accommodated if a single blade were provided without cutout 70. In connection with the rim edges 41, 42 of the two upper bead breaker blades 36, 37, the blades are oriented relative to the rim's peripheral flange 17 when in set up relationship therewith, and the radius 82 of the curvature of the blades is such that the rim's flange 17 contacts each of the blades at at least one point along the rim edges thereof. As to those rim sizes where the blades' rim edges 41, 42 are not flush against the rim flange 17, the clearance C between the rim edges 41, 42 of the blades and the rim's peripheral flange 17 should be not greater than about two times the diameter X of the bead core 90 of the tire 14 on the rim 13. In this regard, and for the 17½" rim diameter rim 86 illustrated in FIGS. 9 and 11, note the clearance between the blades' rim edges 41, 42 and the rim's peripheral flange is about equal to the bead core 90 diameter of the tire 14 when the blades 36, 37 contact the rim's peripheral flange 17 at the outer ends 87, 88 thereof, and the clearance between the rim's flange 17 and the outer ends 87, 88 of the bead breaker blades 36, 37 is about two times the bead core 90 diameter X when the bead breaker blades are used with a 10" rim diameter rim 85. Further in this regard, it is preferred that the width W of the working faces 79, 80 of the bead breaker blades 36, 37 be not greater than about two times the bead core 90 diameter X. This dimensional relationship is important because, during use, it keeps the working edges 41, 42 of the bead breaker blades 36, 37 in very close proximity with the bead core 90 of the tire's upper bead 21 as that bead is broken away from the rim's bead seat 15 throughout a substantial section of the peripheral length of that bead with the bead breaking force being directed downwardly in a common plane 81 along that entire length L of the working face areas 79, 80 defined by the bead blades 36, 37. The upper bead breaker blades 36, 37 must be extensible and retractable relative to the housing 52 a distance H at least equal to the difference between the radii of the smallest rim diameter rim 85 to be served, and the largest rim diameter rim 86 to be served. This for the reason that the rim 13 location on the table 12 cannot be moved since all rims are held in the same centered position on centerpost 25 and sleeve 24 established by hold-down cone 23.

Figures 13, 14:
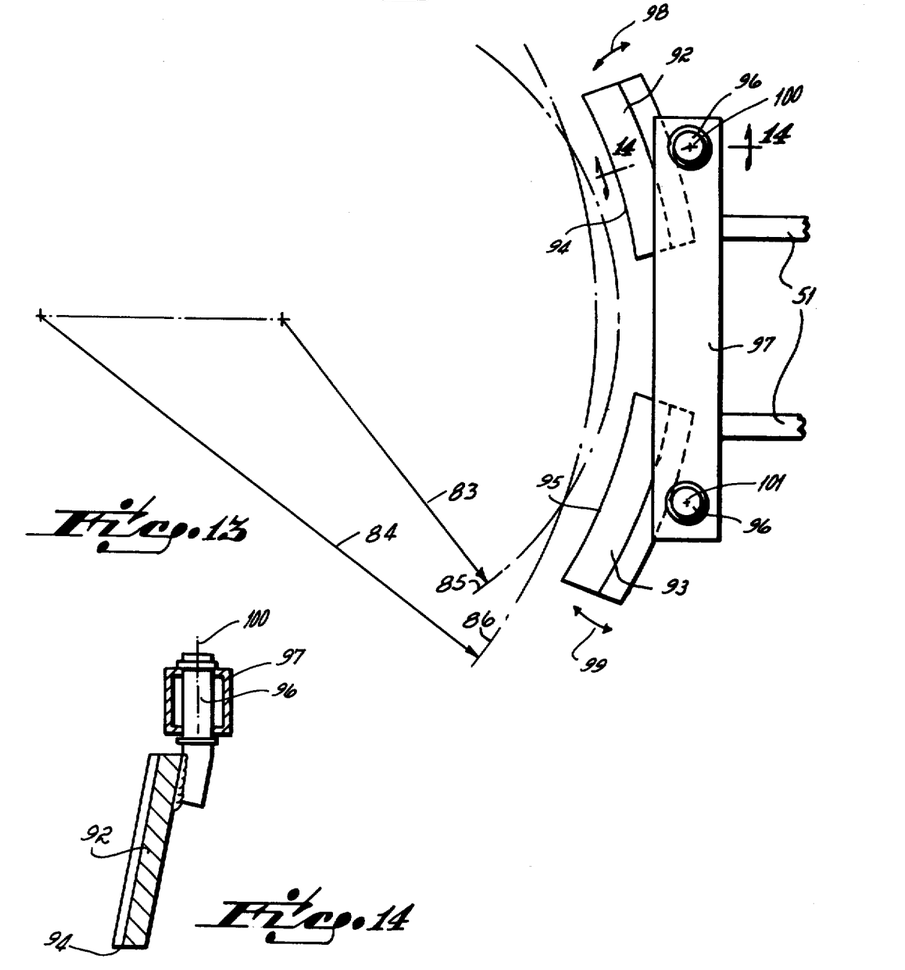
FIG. 13 is a top diagrammatic view similar to FIG. 9 showing a modified embodiment of the upper bead breaker blades.
FIG. 14 is a cross sectional view taken along lines 14—14 of FIG. 13.

An alternative embodiment 91 of the upper bead breaker blades is illustrated in FIGS. 13 and 14. As shown in those figures, the upper bead breaker blades 92, 93 are independent one from another, and are each curved in cross section to define rim edges 94, 95 adapted to serve both a 10" rim diameter rim and a 17½" rim diameter rim. These blades 92, 93 are likewise angled upwardly and outwardly when set up on a tire and abutted against a rim's flange so as to permit the radially inward and downward operation path of the blades without interference between the blades and the rim's flange after being initially positioned thereagainst. The two blades 92, 93 are spaced one from another, and are sized and configured, with the same dimensional and geometrical relationships in mind as described in connection with the bead breaker blades 36, 37 shown in FIGS. 1-11. However, each of the bead breaker blades 92, 93 in this alternative embodiment is positioned on a swivel axis 100, 101 angled relative to the median plane 35 of the tire when the bead breaker blades are set up on the tire in an initial position similar to that shown in FIG. 2. In this particular alternative embodiment, the swivel axes 100, 101 are parallel one to the other, the axis for each blade being established by a post 96 fixed at one end to the blade and extending upwardly into a swivel connection with cross bar 97. The cross bar 97 is fixed to slide arms 51 which are received in housing 52, as explained above in connection with the preferred embodiment. This alternative embodiment is useful in that it allows the blades 92, 93 to pivot along motion paths 98, 99 so as to best and most closely locate the blades rim edges 94, 95 in abutting relation with the peripheral flange 17 of the rim 13, thereby reducing the clearance between those rim edges 94, 95 and the flange 17 during use of the upper bead breaker mechanism.

Power Unit

The machine's power unit 39 includes a fluid motor that may be either pneumatically or hydraulically driven, although a pneumatic motor 105 is illustrated. The pneumatic motor 105 includes housing 106 (on which ear 107 is fixed at the bottom end) and an extensible piston rod 108 (on which ear 109 is fixed at its top or exposed end), see FIGS. 1 and 2. The bottom ear 107 carries crossbar 110, thereby pivotally interconnecting the motor's housing on axis 111 with the power column 62 (and, hence, drivingly connecting the motor 105 with the upper bead breaker 10) at the column's bottom end. The top ear 109 carries crossbar 112 to which the lower bead breaker 34 is pivotally connected on an axis 113, thereby pivotally interconnecting the motor's piston rod 108 with the lower bead breaker. The piston rod 108 is mounted to piston head 114 interiorly of the housing, thereby dividing the housing into chambers 115, 116. Check valve 117 to atmosphere is provided for chamber 115, but chamber 116 is connected (as is described below) to a high pressure air source through source line 118 such as is found in gasoline stations and the like. The check valve 117 admits atmospheric air into chamber 115 when pistion head 114 is being retracted into motor housing 106, but prevents chamber 115 from being exhausted to atmosphere therethrough as piston rod 108 is extended from the housing. Chamber 115 air is exhausted from the motor housing 106 by leaking out around piston rod 108. This provides a dashpot effect and prevents the bead breakers 10 or 34 from rapid movement (and, thereby, prevents undesirable shock forces to the machine 11), if one of the tire's beads 21 or 22 suddenly and totally breaks away from the rim 13 during operation of the power unit 39.

Motor springs 119 are located on the outside of the main frame's side walls 28, and are provided to continually bias or load the fluid motor's housing 106 into the home position as illustrated in FIG. 1. Thus, motor springs 119 also continuously bias the upper 10 bead breakers toward the home or rest position. Each of the springs 119 is attached at one end to a pin 120 mounted on a side wall 28 of the main frame 27, and is attached at the other end to the crossbar 110 which is pivotally connected with the power column 62 through gusset bracket 121, see FIG. 1. The springs 119 are located exteriorly of the main frame's side walls 28, and the power column's bracket 121 is located interiorly of the main frame's side walls, thereby trapping each side wall 28 between a spring 119 and the bracket 121 so as to postively maintain the crossbar 110 within the vertical slots 112 defined in the frame's side walls during operation of the machine.

Although the power column 62, which is part of the power unit 39, is pivotally connected with the motor 105 at crossbar 110, the pivot movement of the power column is strictly limited by control bracket 123 and cradle 124. The U-shaped holder or cradle 124 is mounted to the main frame 27, the arms 125 of the cradle being fixed to side walls 28 of the main frame, see FIG. 1. The cradle 124 functions as an outer support for the power column 62 to prevent it from pivoting or falling away from tire 14. The control bracket 123 is fixed to arms 125, and includes an adjustable limit screw 126. The limit screw 126 permits sufficient clearance to be established between the screw and cross brace 127 of cradle 124 to allow longitudinal motion of the power column 62 relative to its axis 65 as established by motor 105 and springs 119, and to allow limited and controlled pivot motion of the power column sufficient only to establish the blades' operational path 40 as described in further detail below.

The pneumatic circuit for control of the fluid motor 105 is controlled by means of a foot pedal 130 adjacent the base of the machine, see FIG. 1. The foot pedal 130 is interconnected by rod 131 with a spring 132 loaded three-way valve 133. The valve 133 is interconnected with power chamber 116 of the pneumatic motor 105 through line 118. The three-way valve 133 is continually biased toward vent port 134 by tension spring 132, thereby continuously opening power chamber 116 of the fluid motor 105 to atmosphere through line 118 unless the foot pedal 130 is actuated by the machine's operator. The three-way valve 133 is also connected with a high pressure air source, not shown, through a source line 135 such as commonly is found in gasoline stations and the like. Thus, when power chamber 116 is supplied with high pressure air through three-way valve 133 upon actuation of foot pedal 130, the piston head 114 moves upwardly in the housing with air in static chamber 115 being exhausted to atmosphere though the motor housing port through which piston rod 108 extends. This forces the top crossbar 112 upwardly (to which the lower bead breaker 34 is interconnected, as will be explained in detail below), thereby breaking the tire's lower bead 22 from the rim's lower bead seat 16. When the piston 114 reaches its upper limit (due to structure associated with the lower bead breaker 34, as will be explained in further detail below), the fluid motor's housing 105 moves downwardly against the spring 119 forces. This forces the bottom crossbar 110 downwardly in a restricted linear path defined by the vertical slots 122 in the main frame's side walls 28, thereby drawing the power column 62 (and, hence, the upper bead breaker 10) downwardly so as to break the tire's upper bead 21 from the rim's upper bead seat 15. Upon release of the foot pedal 130 by the operator, the spring 132 loaded valve 133 returns to vent port 134 so that power chamber 116 of the fluid motor 105 is vented to atmosphere. When the motor's power chamber 116 is vented to atmosphere, springs 119 function to retract the motor's housing 106 upwardly relative to the slots 122, thereby returning the motor housing (and the upper bead breaker 10) to the home position while drawing air into the chamber 115 through check valve 117.

Lower Bead Breaker Mechanism

Figure 12:
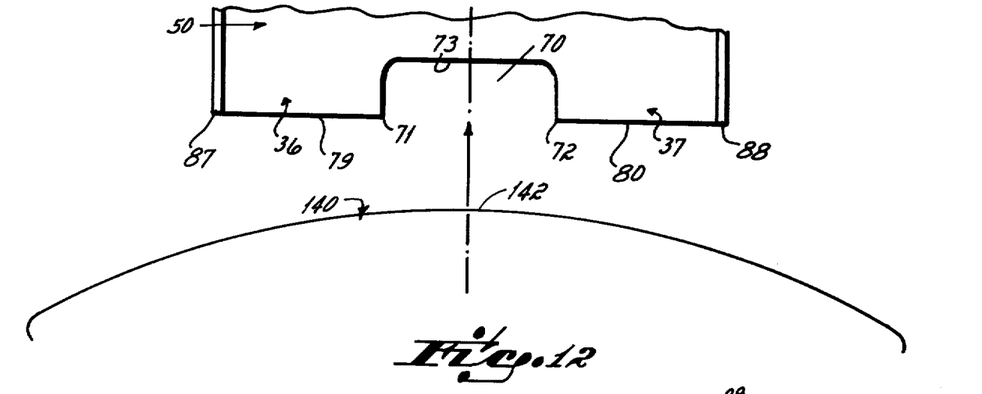
FIG. 12 is an end view taken radially inward relative to the machine's centerpost, and showing the cooperative relation of the upper bead breaker blades and the lower bead breaker blade.

The lower bead breaker 34 mechanism includes the curved blade 140 that defines a leading edge 141, and that is oriented to contact a tire adjacent the lower bead 22 area with its top face 142, see FIGS. 1 and 12. The blade 140 is integral with an arm 143 at each end thereof, the arms (and, therefore, the blade) being pivotally connected to the power unit'stop crossbar 112 at elbows 144 to establish pivot axis 113.

The lower bead breaker's blade 140 is spring 145 loaded. This spring 145 loading continually biases blade 140 to move about pivot axis 113 toward the table 12, i.e., in a counter-clockwise direction as illustrated in the figures, and continually biases the blade toward the rest or home position where piston rod 108 is fully retracted into motor housing 106. A spring 145 is connected at one end to a pin 146 fixed on each arm 143 adjacent the arm's foot 147, and is connected at the other end to pin 148 fixed to the main frame's side wall 28. A stop block 149 is fixed to the side wall 28 in a position to cooperate with the cam toe 150 of each lower bead breaker arm 143, compare FIGS. 1 and 2.

Control arms 151 are connected with the lower bead breaker blade 140 and pneumatic motor 105 to guide or control the general upward path of the blade when the motor is energized. A control arm 151 is pivotally mounted to each side wall 28 at one end by pin 152 to provide pivot axis 153, and is also pivotally connected to the motor's upper crossbar 112 at the other end on the pivot axis 113. These control arms 151 (both of which have the common pivot axis 153 where they are connected to the main frame's side walls 28) function to allow the pivotal interconnection 113 of the lower bead breaker's blade 140 with the fluid motor's crossbar 112 to track in a generally upward path, thereby providing a simple means during use to stabilize the pivot axis 113 of the lower bead breaker's blade as the blade is being moved upwardly by motor 105 and as the blade is pivoting on the upper crossbar to the action of springs 145.

The lower bead breaker 34 also includes a travel limiter assembly 155 that functions to limit the upward travel of the lower bead breaker's blade 140 if desired by the machine's operator, see FIG. 1. Each of the two travel limiter arms 156 on opposite sides of the machine is notched at the upper end to define a seat 157, this seat being adapted to function as an abutment for bar 158 fixed to and extending between the control arms 151. The travel limiter arms 156 are continuously spring 159 loaded about pivot axis 160 (defined by pinning the arms to the frame's side walls 28) to that attitude illustrated in FIG. 1, and are connected with that spring by means of a positioner arm 161 which extends from beneath the table 12 beyond the machine's shroud 30 where it is readily accessible to the operator. Normally the positioner arm 161 is located for use with a narrow tread width tire, i.e., in location as shown in FIG. 1, since it is continuously spring 159 loaded in that direction. When the travel limiter assembly 155 is in this operational attitude, and as the lower bead breaker's blade 140 is moved upwardly by the fluid motor 105, bar 158 (which connects control arms 151) tracks or rides on edges 162 of the travel limiter arms 156. Thus, the interengagement of the lower bead breaker's bar 158 with the travel limiter arms' seats 157 is assured so as to limit the upward travel movements of the lower bead breaker's blade 140. When the positioner arm 161 is drawn to the left (as viewed in FIG. 1) by manually grasping the positioner arm, seats 157 are removed from the travel path of the bar 158 that joins the control arms 151, thereby allowing the lower bead breaker's blade 140 to continue in its upward travel until edges 163 of the control arms engage the underside or base rim 164 of the table 12. The lower bead breaker 140 and travel limiter assembly 155, their structural elements and operation, are more particularly set out in U.S. Pat. No. 3,807,447, issued Apr. 30, 1974, entitled "Bead Breaker Mechanism".

Detailed Operation of Bead Breaker Mechanism

The storage position of the upper bead breaker 10 mechanism, relative to the power column 62 and the rest of the machine 11, is not shown. However, the storage position is easily accomplished simply by swinging the upper bead breaker 10 mechanism from the set up position shown in FIG. 1 to a storge position 90° therefrom. This swinging motion of the upper bead breaker 10 mechanism is easily achieved by an operator by gripping the rear handle 66 with one hand and the front handle or knob 67 with the other hand, lifting up on one or the other of the handles until the centers 63, 64 of the upper 60 and lower 61 ports in the housing 52 are generally aligned with the longitidinal axis 65 of the power column 62, simultaneously lifting up on the latch plate 68, and thereafter lifting the upper bead breaker 10 mechanism while swinging it toward the storage position. The upper bead breaker 10 mechanism is restrained in the storage position at a lower location on the power column 62 by abutting against locator block 49. Of course, the upper bead breaker 10 mechanism is swung from the storage position into the initial or set up position shown in FIG. 1 in reverse fashion.

The lower bead breaker 34 mechanism, in the home position, retracts the lower blade 140 away from the table 12 as shown in FIG. 1. The power chamber 116 of the fluid motor 105 is vented to atmosphere through vent port 134 in the three-way valve 133, and static chamber 115 is vented to atmosphere through the motor housing port through which piston rod 108 extends. Thus, pressure in both chambers 115, 116 of the pneumatic motor 105 is atmospheric in the home position. This motor 105 condition allows springs 119 to fully retract the motor's housing 115 and crossbar 110 up to the top end of the vertical slots 122 in the main frame's side walls 28, thereby pushing the power column 62 up into the home position shown in FIG. 1. This motor 105 condition also allows springs 145 to fully retract the piston rod 108 into the motor housing 106 thereby retracting the lower bead breaker's blade 140 into the home position also shown in FIG. 1. The lower bead breaker's blade 140 is fully retracted out of contact with the table 12, as the piston rod 108 is drawn into the housing 115 by the springs 145, by virtue of cam toes 150 on the blade's arms 143 which ride up on stop blocks 149 fixed to the main frame's side walls 28. This causes the lower bead breaker's blade 140 to pivot away from the centerpost 25 (clockwise as shown in the figures) against the bias of springs 145. The travel limiter assembly 155, unless manually withdrawn from position with the lower bead breaker's bar 158, is spring 159 loaded into that position so that edges 162 of the travel limiter arms 156 are loaded against the lower bead breaker's bar 158.

As mentioned, and prior to commencing operation of the bead breaker 10, 34 mechanism, the upper bead breaker's two blades are positioned in set up relation on the tire's top bead 21 area in abutting relation with the rim's top flange 17, as illustrated in FIG. 1, by first manually pivoting the upper bead breaker housing 52 into generally radial orientation with the rim 13 on the machine's table 12. Subsequently, the upper bead breaker blades 36, 37 are extended radially relative to the rim 13 by extending or retracting slide arms 51 relative to housing 52 until both blades contact the rim's upper flange 17 as shown in FIG. 1, and as shown in FIGS. 9-11 for a small rim diameter rim 85 or a large rim diameter rim 86. This touching or abutting relation of the upper bead breaker blades 36, 37 with the rim's flange 17 in the set up position is important as, along with the geometrical and dimensional relationship of the blades vis-a-vis the diameter of the tire's bead core 90 and the rim as previously explained above, permits the desirable and practical breaking of the upper bead 21 from the rim 13. Power column latch 68 associated with the upper bead breaker 10 maintains the upper bead breaker in fixed position on the power column 62 during the upper bead breaker blade's operational sequence, the structure and operation of that latch being more particularly set out in U.S. Pat. No. 3,827,474, issued Aug. 6, 1974, entitled "Power Column Latch".

After the upper bead breaker 10 has been operationally set up or located as illustrated in FIG. 1, the operator depresses foot pedal 130, thereby causing the bead 21, 22 breaking operational sequence to be carried out automatically until both beads are broken away from the rim's bead seats 15, 16, i.e., are moved into the well 13A area of the rim 13 as shown in FIG. 2.When the foot control pedal 130 of the pneumatic circuit is depressed, three-way valve 133 is biased against spring 132 to connect with high pressure air line 135. This introduces high pressure air into the fluid motor's power chmaber 116 through line 118, thereby forcing the piston 114 toward the top of the motor housing 115 from the bottom of that housing. As the piston 114 is forced toward the top of the motor's housing 115, the lower bead breaker's blade 140 is moved upwardly (since it is connected to piston rod 108 through crossbar 112), see FIG. 2. As the lower bead breaker's blade 140 is moved upwardly, the lower bead breaker's feet 147 are lifted off the stationary stop blocks 149, thereby allowing the lower bead breaker's blade to pivot about axis 113 toward the centerpost 25, i.e., in a counterclockwise direction as illustrated in the figures. It is important to note that, once the lower bead breaker's feet 147 are removed from interengagement with the stop blocks 149, the leading edge 141 of the lower bead breaker's blade 140 contacts the table 12 and rides up on the table's surface until it hits the rim's lower flange 17. As the pneumatic motor 105 continues to move the lower bead breaker's blade 140 upwardly, the blade rides up on the rim's lower flange 17 and tracks or follows the rim's contour until the tire's lower bead 22 is displaced into the rim's well 13A. This tracking function of the lower bead breaker's blade 140 is a result of the spring 145 loading provided, that spring loading tending to rotate the lower bead breaker's blade in the counterclockwise direction as illustrated in the figures.

Once the lower bead breaker 34 has "topped out", i.e., once the lower bead breaker has either abutted against the seats 157 defined by the travel limiter arms 156 (if those arms are in operational position) or once the control arms 163 have abutted the table's base rim 164 (if the travel limiter assembly 155 has been retracted by use of the positioner arm 161), the pneumatic motor's housing 106 begins to move downwardly in response to the continued pneumatic pressure in power chamber 116. This downward motion of the motor's housing 106 is occasioned because of the fact that the motor's piston head 114 is now in a fixed location and unable to move upward any further (either because lower bead breaker's bar 158 is interengaged with the travel limiter seats 157 or because the control arms 151 are abutted against the bottom edge 164 of the machine's table 12). This for the reason that the high pressure air in the fluid motor's power chamber 116 provides downward force on the bottom 167 of the motor's housing sufficient to overcome the spring 119 loading in the upward direction. The downward motion of the fluid motor's housing 106 is, of course, translated into downward motion for the power column 62 and upper bead breaker 10 because the power column is directly connected with the housing by crossbar 110 at pivot axis 111.

The operational or travel path 40 at the leading or rim edges 79, 80 of the upper bead breaker's blades 36, 37, after the power unit 39 has been energized, is ilustrated in FIGS. 2 and 3 in diagrammatic fashion. As shown in those figures, each point on the rim edges 79, 80 of the upper bead breaker blades 36, 37 moves downwardly or inwardly toward the median plane 35 of the rim 13, and also moves radially inward toward the center axis of that rim, from an initial or set up position where the blades contact the rim's peripheral flange 17 as shown in FIG. 8, to a final breaking position where the blades' working faces 79, 80 are entirely located inside a phantom line 78 that passes through the outer peripheral surface of each of the rim's upper and lower flanges 17 as shown in FIGS. 2 and 3. In other words, and when viewed from axially of the rim 13, the blades' working faces 79, 80 are entirely located between the rim's flange 17 and the rim's well 13A in the extended most or final breaking position. Note that the downward and radially inward travel path 40 is generally linear as shown in the figures. This linearity is established because the power column 62 is prevented from substantial pivot motion by means of bracket 123 and cradle bar 127 while it is being drawn downwardly by the power unit 39. However, limited tilting motion of the power column 62 is established as shown by phantom arrow 166 due to pivoting about axis 111 since the guide slots 122 are vertically oriented, and the power column itself is angled, relative to horizontal.

The linear stroke or travel path 40 of the blades' rim edges 79, 80 defines an acute angle 72 with the phantom line 78 that passes through the outer surfaces of the top and bottom flanges 17 of the rim 13. Note particularly this acute angle 72 is significantly less than the acute angle 77 defined by the phantom flange line 78 and another phantom line 168 that contacts the outer surface of the rim's upper flange 17 and the outer surface of the rim's knee 169 as shown in FIG. 3. The clearance 170 established between the rim's knee 169 and the travel path 40 must be at least equal to the diameter of the bead core 90 on the tire 14 mounted on the rim 13. Note also the inclination angle 76 of the upper bead breaker blade plate 50 relative to the phantom line 78 that passes through the rim's flanges 17 as shown in FIG. 3. This allows the operator, in the initial or set up position shown in FIG. 1 to easily view the location of the upper bead breaker blades 36, 37 vis-a-vis the rim's upper flange 17 so as to insure the desired touching relation therebetween prior to commencement of the bead breaking operation. It has been unexpectedly found that this generally linear downward and radially inward extending path 40 of the spaced upper bead breaker blades 36, 37 along with the dimensional relationships of the blades 36, 37, the blade's travel path 40 and the rim 13 relative to the tire's bead core 90 diameter, allows the upper bead 21 to be popped off or unseated from its normal use position with the rim's upper bead seat 15 shown in FIG. 1 to the broken position in the rim's well 13A area as shown in FIG. 2. The spaced upper bead breaker's blades 36, 37 are held in fixed relation to the power column 62 during the downward and radially inward travel path 40 by virtue of arms 51 and housing 52. In other words, once positioned in the set up position shown in FIGS. 1 and 9, the blades 36, 37 do not move relative to power column 62 because they are immobily fixed thereto.

After the tire's beads 21, 22 have been broken away from the rim's bead seats 15, 16, the operator releases foot pedal 130. The spring 132 loading on the three-way valve 133 returns the valve to the vent port 134 attitude, thereby releasing the high pressure air from the power chamber 116 in the fluid motor 105. Once the motor's high pressure chamber 116 is exhausted to atmosphere, springs 119 cause the housing 106 to move upwardly until crossbar 110 abuts the top ends of the main frame's vertical slots 112, i.e., cause the motor's housing to return to the position illustrated in FIG. 1. This return of the fluid motor's housing 106 to the attitude illustrated in FIG. 1 causes the power column 62 to move upwardly and, thereby, causes the upper bead breaker 10 to be returned to the initial or starting position illustrated in those figures from whence it can be lifted and swiveled out of operational contact with the tire 14 and rim 13. Further, the piston rod 108 is fully retracted into the fluid motor's housing 115 and the lower bead breaker 140 drawn downwardly because of springs 145 fixed at one end to the machine's main frame 27 and at the other end to the lower bead breaker arms 143. As the lower bead breaker's blade 140 is drawn downwardly by springs 145, same follows the contour of the rim's outer surface and of the table 12 in a reverse direction until feet 147 of the lower bead breaker's arms approach the stop blocks 149. As cam toes 150 engage the stop blocks 149, the lower bead breakers' blade 140 is pivoted clockwise as illustrated in the figures so as to remove same from contact with the machine's table 12 back into the home or fully retracted attitude illustrated in FIG. 1.

The operation of the upper 10 and lower 34 bead breaker mechanisms have been described by indicating that the lower bead breaker is first pushed upwardly, and the upper bead breaker is subsequently pulled downwardly, by the fluid motor 105. Actual operation of the bead breakers 10, 34 may or may not follow this exact sequence. Indeed, in actual operation it may be the upper bead breaker 10 will move downwardly prior to the lower bead breaker 34 moving upwardly. However, and as is most often the case, actual operation of the machine will generally result in both bead breakers 10, 34 moving toward one another in a substantially simultaneous manner. The exact sequence of the bead breaker operation is mainly dependent on the degree to which each of the tire's beads 21, 22 are stuck or adhered to the rim's bead seats 15, 16. For example, if the tire's upper bead 21 is more tightly stuck or adhered to the rim's upper bead seat 15 than is the tire's lower bead 22 stuck or adhered to the rim's lower bead seat 16, then the lower bead breaker 34 will move upwardly before the upper bead breaker 10 moves downwardly because there will be less resistance for the lower bead breaker to overcome than there is resistance for the upper bead breaker to overcome. However, in actual operation it will more likely be the case that the bead breakers 10, 34 will operate substantially simultaneously upon introduction of high pressure air to the power chamber 116 of the pneumatic motor 105 once the pedal 130 has been depressed by the operator because it is most often the case that both of the tire's beads 21, 22 are roughly stuck to the same degree to the rim's bead seats 15, 16.

Having described in detail the preferred embodiment of my invention what I desire to claim and protect by Letters Patent is:

1. An improved bead breaker mechanism for a tire changer machine, said bead breaker mechanism being adapted to break a tire's bead away from a rim's bead seat when said rim and tire are positioned on said machine's table, said mechanism comprising
   a bead breaker blade which moves in a generally linear and radially inward direction during use from a set-up position in contact with said rim's flange where said blade rests on a tire's bead area toward the rim's center plane to a maximum extension position where said blade's working face is entirely located radially inward of said rim's flange, said blade's rim edge clearing said rim's base in its radially inward path by a distance at least equal to the diameter of said tire's bead core, which generally linear radially inward path is reproduceable time after time upon repeated operation of said bead breaker mechanism with different diameter rims without directly connecting said bead breaker blade to said rim's flange, said bead breaker blade being swingable between a use position where it can be set upon a tire disposed on said machine's table and a storage position where said table is accessible for changing the tires thereon, and
   a power unit connected with said blade for moving said blade downwardly through said generally linear radially inward path against the upward resistance provided by said tire, at least one of said power unit and said blade being pivotable about an axis between a storage position at which said blade is out of operational relation with said tire and a use position at which said blade is swung into operational relation with said tire.

2. A bead breaker mechanism as set forth in claim 1, said blade, relative to a line perpendicular to said rim's center plane, having a set up angle greater than the angle which said blade's rim edge follows in its generally linear radially inward travel path relative to that same line.

3. A bead breaker mechanism as set forth in claim 1, said blade's rim edge defining a generally curvalinear line, and said blade being fabricated of a plate element having a curvature radius greater than the radius of the curvalinear line on which said blade's rim edge lies.

4. A bead breaker mechanism as set forth in claim 3, said mechanism comprising
   a slide arm connected to said blade, and
   a housing adapted to receive said slide arm in sliding relation, said slide arm being slidable into and out of said housing a distance at least equal to the difference in radius of the rims which said breaker mechanism is adapted to serve.

5. A bead breaker mechanism as set forth in claim 4, said power unit comprising
   a power column, said housing being slidably received axially on said power column and, said housing being structured to rotate relative to said power column, thereby allowing said bead breaker mechanism to be positioned in use or storage position as desired.

6. A bead breaker mechanism as set forth in claim 3, said mechanism comprising
   an inner stop and an outer stop, said stops being partially carried by said housing and partially carried by said slide arm, said stops preventing removal of said slide arm from said housing and cooperating to define the inner and outer positions of said blade relative to said housing.

7. A bead breaker mechanism as set forth in claim 1, said mechanism further comprising
   pivot structure connected with said blade that allows said blade to pivot on an axis that is angled relative to the center plane of said rim when said blade is positioned in set up position, pivoting of said blade permitting said blade to be oriented in that position relative to said rim's flange that provides minimum clearance between said blade and said rim's flange upon use.

8. A bead breaker mechanism as set forth in claim 6, said mechanism further comprising
   a second blade adapted to be positioned against that bead area of said tire opposite to the bead area with which said first blade cooperates, said second blade having a curved working face that is curved when viewed in the rim's center plane from a radial line of sight relative to said rim, said curved radius of said second blade cooperating with a planar working face of said first blade to aid in breaking both beads of said tire away from said rim's bead seats.

9. A bead breaker mechanism for a tire changer machine, said bead breaker mechanism being adapted to break a tire's bead away from a rim's bead seat when said tire and rim are positioned on said machine's table, said mechanism comprising two blades each defining a working face, which working faces are oriented in a common plane adapted to contact the bead area of said tire upon being abutted against a rim's flange when set up prior to use, the rim edges of said two faces lying on a common generally curvalinear line and being disposed in said common plane, said curavlinear line being sized and configured such that neither blade's rim edge is spaced from said rim's flange a distance greater than about two times the diameter of the tire's bead core at any point therealong, and the working faces each having a width not greater than about two times the diameter of the tire's bead core, and a power unit connected with said blade for moving said blades downwardly through a controlled and predetermined path without directly connecting said bead breaker blade to said rim's flange, said power unit being structured to draw said blades radially inward toward the rim's center plane from the set up position without contact of said blades with said rim's knee.

10. A bead breaker mechanism as set forth in claim 9, said blade, relative to a line perpendicular to said rim's center plane, having a set up angle greater than the angle to which said blades' rim edges follow in the generally linear radially inward travel path relative to that same line.

11. A bead breaker mechanism as set forth in claim 9, said blade's rim edge clearing the knee of said rim in its radially inward path by a distance at least equal to the diameter of said tire's bead core.

12. A bead breaker mechanism as set forth in claim 11, said blades being fabricated of a single plate element, said plate element having a curvature radius greater than the radius of the curvalinear line on which said blades' rim edges lie.

13. A bead breaker mechanism as set forth in claim 11, said mechanism comprising
a slide arm connected to said blade, and
a housing adapted to receive said slide arm in sliding relation, said slide arm being slidable into and out of said housing a distance at least equal to the difference in radius of the rims which said bead breaker mechanism is adapted to serve.

14. A bead breaker mechanism as set forth in claim 13, said power unit comprising
a power column, said housing being slidably received axially on said power column, and said housing being structured to rotate relative to said power column, thereby allowing said bead breaker mechanism to be positioned in use or storage position as desired.

15. A bead breaker mechanism as set forth in claim 13, said mechanism comprising
an inner stop and an outer stop, said stops being partially carried by said housing and partially carried by said slide arm, said stops preventing removal of said slide arm from said housing and cooperating to define the inner and outer positions of said blades relative to said housing.

16. A bead breaker mechanism as set forth in claim 9, said mechanism further comprising
pivot structure connected with at least one of said blades that allow said blade to pivot on an axis that is angled relative to the center plane of said rim when said blades are positioned in set up position, pivoting of said blade permitting said blades to be oriented in that position relative to said rim's flange that provides minimum clearance between said blades and said rim's flange upon use.

17. A bead breaker mechanism as set forth in claim 15, said mechanism further comprising
a third blade adapted to be positioned against that bead area of said tire opposite to the bead area with which said first and second blades cooperate, said third blade having a curved working face that is curved when viewed in the rim's center plane from a radial line of sight relative to said rim, said curved radius of said third blade cooperating with said planar working faces of said first and second blades to aid in breaking both beads of said tire away from said rim's bead seats.

* * * * *